United States Patent
Rosenberg et al.

(10) Patent No.: US 6,246,337 B1
(45) Date of Patent: Jun. 12, 2001

(54) VEHICLE PARKING SYSTEM (75) Inventors: Armand David Rosenberg, Rehovot; Avigdor Kaner, Arad, both of (IL)

(73) Assignee: Baran Advanced Technologies (86) Ltd., Omer (IL)

( * ) Notice: Subject to any disclaimer, the term of this patent is extended or adjusted under 35 U.S.C. 154(b) by 0 days.

(21) Appl. No.: 09/051,178

(22) PCT Filed: Jul. 29, 1996

(86) PCT No.: PCT/IL96/00068

§ 371 Date: Sep. 4, 1998

§ 102(e) Date: Sep. 4, 1998

(87) PCT Pub. No.: WO97/13222

PCT Pub. Date: Apr. 10, 1997

(30) Foreign Application Priority Data

Oct. 6, 1995 (IL) ......................................... 115531
Dec. 11, 1995 (IL) ......................................... 116336

(51) Int. Cl.$^7$ ..................................................... G08B 1/08
(52) U.S. Cl. ........................ 340/932.2; 340/539; 340/904; 340/988
(58) Field of Search ...................... 705/13, 418; 235/378; 340/825.31, 932.2, 539, 933, 902 R, 904 R, 905, 425.5; 455/556, 557

(56) References Cited

U.S. PATENT DOCUMENTS

| 4,310,890 | 1/1982 | Trehs et al. . |
| 4,555,618 | 11/1985 | Riskin . |

(List continued on next page.)

FOREIGN PATENT DOCUMENTS

| 38 05 810 | 9/1989 | (DE) . |
| 41 38 723 | 8/1992 | (DE) . |
| 43 44 433 | 7/1995 | (DE) . |
| 0006079 | 5/1983 | (EP) . |
| 0 501 058 | 9/1992 | (EP) . |
| 2 562 291 | 10/1985 | (FR) . |
| 2 670 002 | 6/1992 | (FR) . |
| 2 680 263 | 2/1993 | (FR) . |
| 98880 | 7/1991 | (IL) . |

(List continued on next page.)

OTHER PUBLICATIONS

Copy of the International Search Report for PCT/IL96/00068.

Primary Examiner—Nina Tong
(74) Attorney, Agent, or Firm—Pepper Hamilton, LLP (57) ABSTRACT

A vehicle parking network comprises a transmitter-responder device (TRD) for each subscriber and a complementary box which can be coupled to the TRD and only to it, and permits it to communicate with a central computer. The complementary box is provided with identification marks that can be scanned from the outside and includes a microcontroller, memory means and timing means. Once the vehicle is parked, the TRD is used to obtain from the computer a parking authorization and an allowed parking time. Then a legitimate parking sign is displayed and the parking time is downcounted until the allowed time has been completed or until the vehicle leaves the parking space. If communication with the computer cannot be established, the complementary box carries out an assumed parking procedure, stores its data in a buffer memory, and later transmits them to the computer for verification and registration. The computer communicates the data of each parking to the Public Authority charged with collecting the parking fees. Examples of TRD's are cellular phones, message records, pagers, private alarms and vehicle location units (VLU). If a VLU is used, the central computer obtains vehicle location data from the control center of the vehicle location system, monitors the vehicle position, and carries out the parking procedure.

11 Claims, 6 Drawing Sheets

U.S. PATENT DOCUMENTS

| | | |
|---|---|---|
| 4,717,815 | 1/1988 | Tomer . |
| 4,814,595 | 3/1989 | Gilboa . |
| 4,847,776 * | 7/1989 | Huang ................................. 364/467 |
| 4,879,553 * | 11/1989 | Righi ................................ 340/932.2 |
| 5,166,680 | 11/1992 | Ganat . |
| 5,266,947 | 11/1993 | Fujiwara et al. . |
| 5,285,425 * | 2/1994 | Morisawa ............................. 368/10 |
| 5,339,000 | 8/1994 | Bashan et al. . |
| 5,740,050 * | 4/1998 | Ward, II ........................ 364/464.28 |
| 5,940,481 | 8/1999 | Zeitman . |
| 6,052,068 * | 4/2000 | Price R-W et al. ................. 340/933 |

FOREIGN PATENT DOCUMENTS

| | | |
|---|---|---|
| 410103976 * | 4/1998 | (JP) . |
| WO 84/01073 | 3/1984 | (WO) . |
| WO 93/20539 | 10/1993 | (WO) . |
| WO 94/02909 | 2/1994 | (WO) . |
| WO 94/07206 | 3/1994 | (WO) . |
| WO 96/11453 | 4/1996 | (WO) . |
| WO 97/19568 | 5/1997 | (WO) . |
| WO 98/04080 | 1/1998 | (WO) . |
| WO 98/49654 | 11/1998 | (WO) . |
| WO 99/10844 | 3/1999 | (WO) . |
| WO99/49419 * | 9/1999 | (WO) . |

* cited by examiner

VEHICLE PARKING SYSTEM

FIELD OF THE INVENTION

This invention relates to an improved vehicle parking method and systems, more particularly to a method and systems which do not require the use of parking meters or parking cards and which permit charging each user with the appropriate parking fees and crediting the appropriate parking authorities with said fees.

BACKGROUND OF THE INVENTION

Numerous parking systems have been described and are known in the art. Most of them, however, are relatively complicated and/or imperfect for various reasons, e.g. they may not assure that parking fees are debited to the appropriate persons or accredited to the appropriate parking authority, or they may make fraudulent use of the system possible, and so forth. Most parking systems require the use of parking meters, of more or less complicated structure and operation, and/or parking cards, the use of which may be complicated and inconvenient and which may require recharging or exchanging them, and so forth. It would be desirable to eliminate these drawbacks and to provide a system which is simple, economical, easy to operate, and foolproof.

WO 93/20539 describes a system in which a unique alphanumeric code is assigned to each parking space and a vehicle is also assigned a unique alphanumeric code. When the vehicle has been parked in the parking space, the driver dials on a telephone the code of that parking space, the vehicle code and the personal or payment responsibility code. This code combination is sent via a transmitter and a relay station to a database, and the information concerning the parking space, the vehicle using it and the person responsible for paying the parking fee are registered. When the driver collects the vehicle from the parking space, he or she sends again the aforesaid information to said database over the vehicle telephone, and the database records that the parking period has been terminated. In this way the parking cost is debited by an appropriate authority or company.

This system, however, is defective in several ways. Firstly, it is extremely difficult to detect illegal parking, since this require acquiring a graphic picture of the parking areas supervised and checking with the aid of a computer whether the vehicle's code have been registered in the data base. Since there is no control of the information which the user sends via the telephone, the difficulties involved in this data comparison make parking frauds easy. Further, there is no way to detect immediately whether a vehicle is parking overtime. Such detection requires registering the plate numbers of all the parked vehicles and asking a central computer to check whether the driver of any of them may not have falsely indicated that the vehicle has left the parking space. This is certainly impractical and inefficient. With this technique it is possible to request and terminate the parking from outside the car, which is highly undesirable.

FR-A-2.670.002 describes a vehicle location system which comprises an apparatus including means for receiving reference spatial signals from satellites, computer means for calculating the position of the vehicles for such signals, modulation means for generating a modulated signal representative of the calculated position of the vehicle, and radioelectric terrestrial communication means for transmitting said modulated signal to a vehicle location central station. This system, however, is a vehicle location and not a parking system.

FR-A-2.562.291 describes a parking system which comprises a first memory for registering amounts of monetary sums, controllable means for emptying said memory so that it may, thereafter be representative of the variation of the value of said sums as a function of the time which has passed starting from a given starting time, means for elaborating signals to represent the state of said memory at a given moment, and means for emitting electromagnetic waves, the value of which represents said signals and which are adapted to be received by analysis and elaborating means. This parking system is merely a system for evaluating the parking fees due as a function of parking time, is not apt to provide a central database with other pertinent data nor to discover illegal parking, and is not fraud-proof.

It is a purpose of this application to provide a parking method and apparatus that are simple, easy to use, economical and foolproof.

It is another purpose of this invention to provide a parking method and apparatus which do not require the use of parking meters or parking cards.

It is a further purpose of this invention to provide a parking method and apparatus which permit easy supervision of the parking location and immediate identification of the illegally parked vehicles.

It is a still further purpose to provide a parking method and apparatus which exclude all possible abuses or frauds on the part of the users.

It is a still further purpose to provide a parking method and apparatus that are very attractive and convenient both to users and to parking authorities.

It is a still further purpose to provide a parking method and apparatus which can be supervised easily and efficiently.

It is a still further purpose to provide a parking method and apparatus which render the allocation and distribution of the parking fees both simple and extremely accurate.

It is a still further purpose to provide a parking method and apparatus which permit the public agency, which exercises its authority over the parking zones, e.g. the city administration, to decide the parking time and other parking conditions according to zones.

It is a still further purpose to provide a parking method and apparatus which prevent damaging of parking apparatus, due to vandalism or other reasons.

It is a still further purpose to provide a parking method and apparatus which prevent the scattering of refuse, such as used parking cards, in or in the vicinity of parking zones.

It is a still further purpose to provide a parking method and apparatus which do not require recharging of parking meters or exchange of parking cards.

It is a still further purpose to provide an integrated vehicle location system and parking network.

Other purposes and advantages of the invention will appear as the description proceeds.

SUMMARY OF THE INVENTION

The following nomenclature, used in this specification and claims, should be clearly defined for a complete understanding of the invention. Let us consider a public agency, such as a city, province, county or region administration which exercises its authority over a given territory. Such agency will be called "the public authority" or "the authority"—briefly, "the PA". The territory will comprise, in general, a plurality of parking zones and the parking fees and fines, if any, will in the end be collected by the authority, which will also take any steps required to enforce the traffic laws and apply any penalties for their violation, which steps, however, are outside the scope of the parking method according to the invention. The PA will also establish the parking fees and other parking conditions and limitations.

In each territory, controlled by a public authority, or in one or more parking zones contained therein, one or, generally, a plurality of agencies will be authorized to operate the parking method according to the invention. Such agencies will be called "operating agencies"—briefly, "OA"s. The territory or the plurality of parking zones in which an OA operates will be called "the territory" of that OA. The territories of different OA's may overlap, viz. a plurality of OA's may operate in the same parking zone or zones. The array of apparatus and devices for carrying out the parking method of the invention in any given territory of an OA will be considered and called "a parking network". In general, therefore, there will be a parking network for each OA; but if an OA should operate in several separate territories, there will be several parking networks operated by said OA. The parking network, if there is only one, or the parking networks, if there is a plurality of them, constitute the apparatus or system according to the invention. The OA's generally, though not necessarily, are companies operating systems or networks of devices that can receive and transmit radio signals or messages, which devices will be collectively designated as transmitter-responder devices (hereinafter "TRD"). Examples of TRD are cellular phones, message recorders, pagers, private alarms, vehicle location units, and the like. As is well known, a plurality of such companies usually operate in the same territory.

Each person that is interested of making use of a parking network, or, as may be said, of entering a parking network, will be called hereinafter a "subscriber". The subscriber need not necessarily be the driver or owner of a vehicle that will be parked according to the method of the invention. The person who actually parks the vehicle will be called hereinafter the "driver". It is one of the advantages of the parking method according to the invention that it is irrelevant whether the driver is also the subscriber: the OA recognizes only the subscriber and attributes to it any communication it receives.

Each parking network according to the invention comprises, generally, a central computer, or, possibly, a number of central computers, operated by the OA, and, for each subscriber, in combination with a TRD, e.g. but not exclusively a cellular telephone, it comprises a complementary box, which can be coupled to said TRD, and only to it, and permits said TRD to communicate with said central computer. Each central computer is assigned a numerical address—hereinafter "the computer's nominal number"—which is public and known to all subscribers, but the computer will not accept any TRD communication unless the nominal number is dialed together with a numerical code stored in the memory of the complementary box (hereinafter also called "the integrating code"). The nominal number may include the designation of the parking zone and any other relevant information, in order to simplify the connection with the OA. The combination of the nominal number and the integrating code will be called "the computer's address". The TRD identifies the subscriber for the purpose of charging him with parking fees, either through the TRD number, which is recorded by the central computer when parking is requested through the TRD, or through another code of any kind which can be transmitted by the TRD or associated with it. If the computer's line is open when the TRD dials the computer's address, the parking procedure, hereinafter described, will take place immediately. If said line is busy, the computer will so signal, and the delayed parking procedure, hereinafter described, will take place.

During the parking procedure, or at least at its beginning, the complementary box is intended to be coupled with the TRD. Said box is provided with display means, visible from outside the vehicle to a parking supervisor, for signaling authorized parking and the expiration of the allowed parking time, and other pertinent information, if any. If the complementary box has not been coupled with the TRD, the parking procedure cannot be carried out and no parking can be authorized, and said box indicates this by failing to signal that it is activated. The same is true if, for any other reason, the parking is not authorized by the central computer. When the authorized parking period has ended, the complementary box display means cease to indicate legal parking and indicates overtime parking. This is preferably achieved by providing said box with timing means, which registers the allowed parking time and measures the actual, elapsed parking time. In all cases in which the vehicle is not legally parked, information as to this fact can be transmitted to PA, as part of the supervising procedure, hereinafter described.

The term "coupling" is herein usually intended to indicate a physical coupling between the TRD and the complementary box, but it should be well understood that it may also refer to a coupling realized by radiation, e.g., electromagnetic waves.

Preferably, said complementary box comprises identification marks or indices, e.g. numerical identification means such as a bar code or the like, which can be scanned and registered from outside the vehicle, generally through the windshield. Said identification marks correspond to the TRD identification number, so that they also identify the subscriber. The absence of the complementary box renders the parking illegitimate.

It should be noted that, although this has not been illustrated, the complementary box need not be in a single piece, but may be constituted, for example, by two components, one of which may be a standard or universal one mounted by the car manufacturer, while the other one, provided and coupled to it when requested by a subscriber, will be adapted to the particular TRD used by the subscriber.

The complementary box includes:

a microcontroller or CPU which controls the operations of the box;

memory means for storing numerical addresses or "nominal numbers" of central computers that are part of the parking system and integrating codes;

means for storing and transmitting to said microcontroller identification numbers or marks, which correspond to the TRD identification number;

timer means for timing the duration of the parking;

buffer means for transmitting information to the TRD and buffer means for receiving information from the TRD; and general bus means for establishing the required connections between all the aforesaid components.

An embodiment of a such a complentary box further comprises:

power supply backup means for connecting to a main power supply;

a display;

driver means for communicating to the display the signals required for carrying out the supervision steps hereinbefore defined; and parallel/serial input/output means.

A particular embodiment of a complementary box will be described hereinafter.

Preferably, each parking network according to the invention additionally comprises a number of parking control devices, for use by parking supervisors, each of which comprises scanning means for reading the identification marks and the display signs of the complementary boxes, validation means, memory means for registering the information obtained from the scanning and any other pertinent information, and coupling means for coupling the control device to a terminal or computer or other information receiving device belonging to the PA.

The invention further provides a parking apparatus, comprising a plurality of networks as hereinbefore described.

The method of controlling vehicle parking and charging parking fees to the user, according to the invention, comprises therefore the steps of:

1. providing at least one central computer;
2. providing, for each subscriber, at least one transmitter-responder device and a complementary box, exclusively coupled the one to the other and correspondingly identified, the complementary box having display means for visually indicating its activation and the non-expiration or expiration of the allowed parking time;
3. once the vehicle has been parked, coupling said TRD to said complementary box, unless they were already so coupled;
4. controlling the specific parking location, its code and any other necessary parameters, if any, associated with it (said code and parameters being derived from a sign placed at the parking zone or being known to the user by other means);
5. dialing the central computer's nominal number, integrated with a code stored in the memory of the complementary box, to constitute the computer's address, and further, dialing the said parking zone's code and necessary parameters;
6. if the connection of the TRD with the central computer is effected, carrying out the following steps:
   I. sending from the central computer to the TRD a parking authorization, the allowed parking time, and any other pertinent data, if any, thereby completing the parking procedure;
   II. if the parking procedure has been completed, activating in the complementary box display a sign indicating legitimate parking and the parking zone;
   III. downcounting, by means of a timer comprised in the complementary box, the actual parking time, viz. continuously counting the time that has passed and subtracting it from the allowed or maximum parking time;
7. if the connection of the TRD with the central computer is not effected, carrying out the following steps:
   A. storing in the complementary box's buffer memory the data dialed by the TRD, placing the TRD in a waiting list and sending to the TRD a signal indicating that this has been done;
   B. activating, in the complementary box display, a sign indicating legitimate parking and the parking zone and beginning to downcount, by means of a timer comprised in the complementary box, the actual parking time;
   C. when the connection of the TRD with the central computer has been effected, continuing the countdown of the actual parking time, and, at the end of the allowed parking time, deactivating in the complementary box display the sign indicating legitimate parking and activating a signal indicating overtime parking;
8. if the vehicle leaves the parking space before the end of the allowed parking time, signaling this fact from the TRD to the central computer, stopping the downcounting of the parking time and deactivating the complementary box display.

The method may further comprise: if, at the end of the allowed parking time the TRD has not signaled that the vehicle has left the parking space, deactivating in the complementary box display the sign indicating legitimate parking and activating a sign indicating overtime parking; communicating from the central computer to the PA the subscriber's number, the parking location, the actual parking time, and other data, if any, required for the PA to collect the parking fees from the subscriber.

The parking fees could also be collected by the OA, based on the same data, and transferred accordingly to the PA.

If the allowed parking time elapses before the parking has ended, the sign indicating legitimate parking in the complementary box display is deactivated and a sign indicating overtime parking is activated.

In carrying out the aforesaid parking method, it may occur that the connection of the TRD with the central computer is not effected and cannot be effected within an acceptably short time, because of a failure in the central computer or a breakdown of communication for any reason. In this case, means are preferably provided in the complementary box for signaling to the driver the impossibility of establishing communication, or it may be that such means are not provided or do not operate, but the driver becomes aware of an excessively long delay in establishing communication with the central computer. To account for such occurrences, in an embodiment of the invention, buffer memory means, activatable by the driver, are provided in the complementary box for registering the same operations that would have occurred had the normal parking operations been carried out. Specifically, the complementary box is programmed to register in the buffer memory an assumed parking authorization, an assumed allowed parking time, and any other assumed, pertinent data that may be required. The assumed allowed parking time and other data are determined by the parking location's code and by any other parameters associated with it, as in any parking. The sign indicating legitimate parking is actuated and the countdown is carried out. At the end of the parking, said sign is deactivated and the time is registered in the buffer memory. The driver may then leave the parking space, and, if appropriate, take the TRD with him. Thereafter, when a parking authorization is requested for a first time, or prior to that, at any time selected by the driver, the contents of the buffer memory are transmitted to the central computer. The central computer verifies that the registered parking procedure was correct, viz. that it would have transmitted to the TRD, if communication had been established when the parking actually occurred, the same data that are registered in the buffer memory, including the parking authorization, the allowed parking time, and any other pertinent data. If it is verified that the registered parking operations are correct, the central computer communicates to the PA the subscriber's number, the parking location, the actual parking time, and other data, if any, required for the PA to collect the parking fees from the subscriber, as it would have done as a result of normal parking operations; and then communicates to the TRD the authorization to resume normal operation. Until said authorization has been received, the complementary box does not allow any other parking to be carried out; and if it is refused, or has not been received within a given, predetermined time, it displays a signal indicating illegal parking. The central computer also registers an illegal parking, for all relevant purposes.

In addition to the steps of the parking method, set forth hereinbefore, the following supervision steps are a preferred part of the invention:
- a—providing the supervisors of parking locations with control devices for validating the complementary boxes and for scanning and registering from outside the vehicles their identification codes;
- b—registering, for each such identification code, the fact of legitimate or illegitimate parking and, optionally, the reason of this latter (e.g. inactivation of the complementary box or overtime parking) and any other pertinent data;
- c—preferably, periodically, e.g. at the end of the supervisor's shift, transmitting to the PA the data contained in the memory of said supervisor's control device.

According to an embodiment of the invention, a VLU is used as TRD.

Vehicle location units are apparatus that are well known in the art and are widely used for various purposes. Among such purposes are: locating stolen vehicles, for which purpose the VLU is activated if the vehicle is stolen; signaling the position of a vehicle in case of the vehicle's failure or in other emergency situations; and monitoring the position of various vehicles constituting a fleet, e.g. of transport trucks or public vehicles of any kind.

The VLU is part of a system which includes a control center, a plurality of fixed stations, having transmitting and receiving antennae, and the VLU apparatus itself. In a type of VLU systems, the VLU apparatus, carried by the vehicle, holds an identifying address code. The control center transmits a modulated signal, viz. a referencing signal, to the vehicle to be located, via the fixed stations. The VLU receives the signal and compares it to its identifying address. If it corresponds to it, the VLU sends an answer signal. The answer signal is received by the fixed stations, and is transmitted to the control center, which compares the information received from the fixed stations, in order to determine, e.g., the distance of the vehicle from each one of said stations and to compute therefrom the location of the vehicle. A VLU of this kind is described in UK patent application 2234140A.

Alternatively, the VLU may transmit to the fixed stations, once it has been activated by the driver or automatically (as in case of theft) a signal comprising an identifying code of its own, and the fixed stations and the control center will operate as set forth above.

Now, according to said embodiment of the invention, the vehicle parking system comprises, as TRD, a vehicle location unit. Additionally, however, the vehicle that is part of the parking system comprises means for placing the VLU in communication with the central computer or with a central computer of the parking system. These means, as well as other elements hereinbefore mentioned, which are not part of a normal VLU, should be considered as constituting the complementary box according to the invention.

If the VLU is intended to be used only for emergency situations, it will not normally transmit a signal, and the aforesaid complementary means will be activated by the driver when he starts parking and deactivated when the parking ceases. When the signal of the VLU, which will contain a vehicle identifying code and may contain the identification of the parking place and other pertinent data, is received by the central computer, this will operate to monitor the parking, determine its duration, and transmit to the complementary box the signals required for carrying out the supervision procedure.

However, it may be that the VLU is to operate continuously for a longer or shorter length of time while the vehicle is in motion. This may occur if the VLU system is used to track the vehicle at all times, so that its position may be always known to a control center; of it the driver actuates the VLU when he intends to seek a parking position or when the vehicle approaches such a position. In such cases, during the time in which the VLU is operated, the central computer will constantly know the position of the vehicle and will not require any activating signal when parking begins, because whenever the vehicle stops moving, it will compare the location of the vehicle to the parking locations which it controls, and if it is one of said parking locations, will start the parking procedure. It is clear that in this case the central computer must receive from the vehicle location control center the information relative to the position of the vehicle. Therefore, said central computer and said control center will be connected by information exchange means, which will be activated when the VLU starts operating, by the same signal which activates the vehicle location system.

In the previously mentioned case, viz. if the VLU is activated by the driver only for purposes of starting a parking procedure and only at the moment of parking, the same operational phases may take place, viz. the signal which starts the operation of the VLU will also cause the central computer to be placed in information exchange connection with the vehicle location control center; however, alternatively, the driver may communicate to the central computer a parking code, containing identification of the parking zone, as herein described, and in this case there will be no need for exchange of information between the vehicle location system control center and the central computer.

Consequently, this invention comprises a method of controlling vehicle parking and charging parking fees to the user, which comprises the steps of:
1. providing at least one central computer;
2. providing a vehicle location system, comprising a control center, a number of fixed stations and a VLU for each subscriber;
3. signaling to said central computer, at any desired time, a request that the vehicle location be monitored for parking control purposes;
4. when said signal is sent, sending from said central computer to said control center a request for vehicle location data;
5. when said request for vehicle location data has been sent, sending from said control center to said central computer the requested data;
6. monitoring the vehicle position, based on said vehicle location data, and determining therefrom when and where the vehicle has stopped;
7. comparing the location at which the vehicle has stopped with a list of parking locations controlled by said central computer, and, if said location at which the vehicle has stopped is one of them, registering the beginning of a parking;
8. activating a sign visible from outside the vehicle indicating legitimate parking;
9. counting the actual parking time;
10. when the vehicle begins to change its location, registering the end of the parking;
11. communicating from the central computer to the PA the subscriber's number, the parking location, the actual parking time, and other data, if any, required for the PA to collect the parking fees from the subscriber.

Once the central computer has identified the parking location, it will know whether there is a maximum parking time or other limitations in that location and will send to the VLU or to the display, if this is provided with autonomous receiving means, a signal embodying said limitations, and any violation thereof will be recognized by parking supervisors upon checking the display. In particular, if the maximum parking time has elapsed and the central computer has not registered that the vehicle has moved and therefore has not sent to the VLU or to the display a signal that the parking has ended, the display will indicate illegal parking.

In an embodiment of the invention wherein a VLU is used as TRD, the complementary box may be provided with buffer memory means for registering assumed parking operations, if communication with the central computer cannot be established, as hereinbefore described with reference to a generic TRD. When the data registered in the buffer memory are sent to the central computer, this latter will check the correctness of said data, obtaining from the control center of the vehicle location system the location of the vehicle as it was at the time the data were registered. If the control center is normally unable to supply retroactive location data, means may be provided for the VLU to request that it register the vehicle location at the relevant time, so as to be able to communicate it to the central computer when this latter requests it, or means my be provided for the driver to request that the control center communicate said location to the VLU, which can then register it in the buffer memory of the complementary box.

The invention further comprises an integrated vehicle location system and parking network, which comprises;

a—the components of a vehicle location system, viz. at least a control center, a number, e.g. three, of fixed stations and a VLU for each subscriber; and b—the components of a parking network, comprising at least one central computer, and, for each subscriber, in combination with said VLU, means for permitting said VLU to communicate with said central computer.

According to one aspect of the invention, said integrated vehicle location system and parking network further comprises means for exchanging information between said vehicle location system control center and said parking network central computer, e.g. means in said computer for requesting location data from said control center and means in said control center for sending location data to said central computer.

Preferably, said integrated vehicle location system and parking network further comprises accessory means and components, such as: display means associated with the VLU, visible from outside the vehicle, for signaling authorized parking and the expiration of the allowed parking time, and any other pertinent information; timing means, which registers the allowed parking time and measures the actual, elapsed parking time; control means for parking supervisors and any other means required for carrying out the parking supervision steps.

As noted hereinbefore, said means for permitting said VLU to communicate with said central computer, said display means and said timing means, when present, and any other elements not included in conventional VLU's, should be considered as constituting the complementary box according to the invention, although they might in fact not be separate elements combined with a conventional VLU, but integral elements of a VLU modified to permit or improve its use as the TRD of a parking system and device. Their provision is, in any case, within the scope of this invention.

DETAILED DESCRIPTION OF PREFERRED EMBODIMENTS

Figure 1:
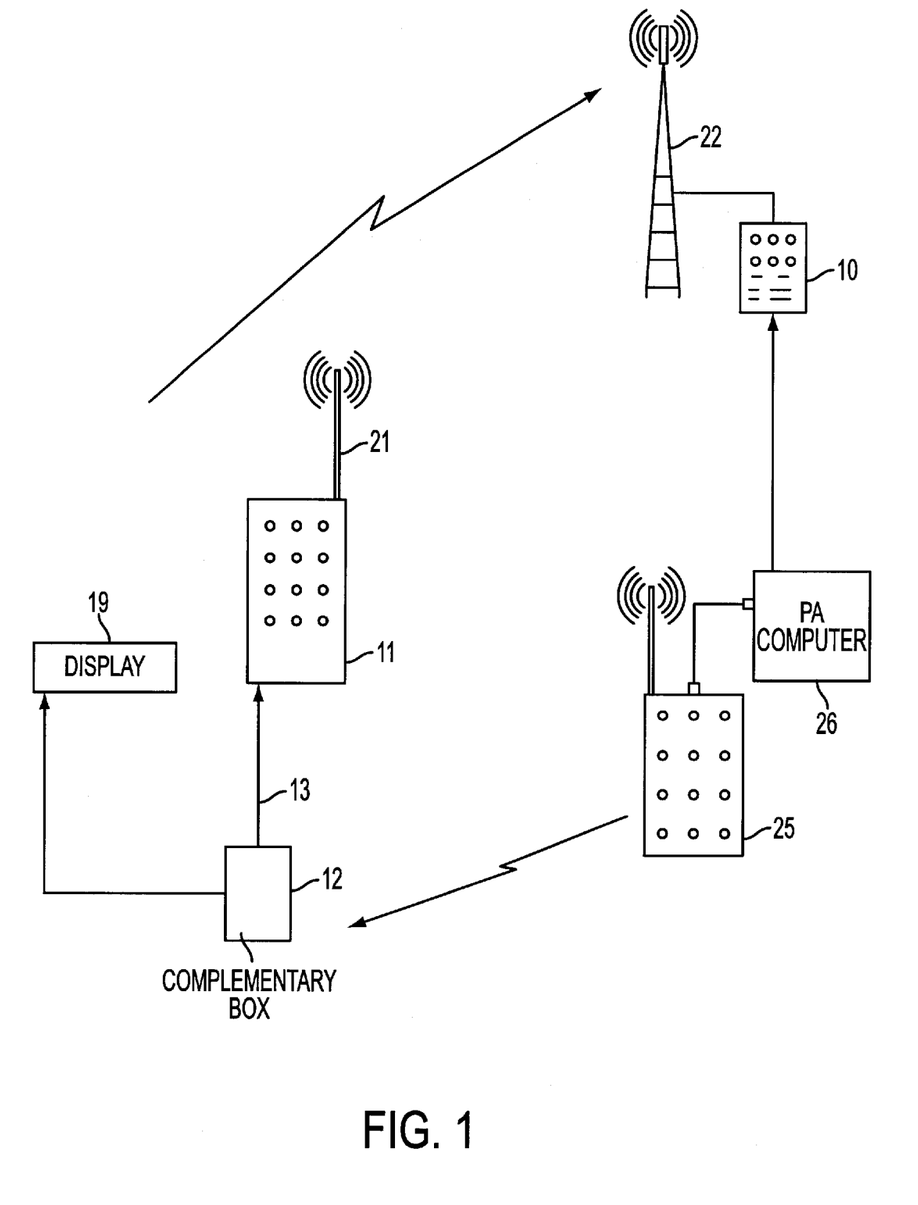
FIG. 1 is a schematic illustration of the parking system according to an embodiment of the invention.
Figure 2:
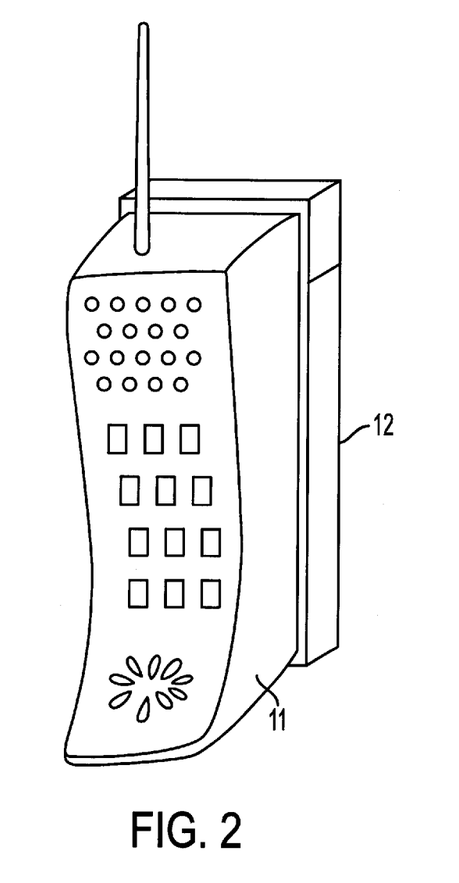
FIG. 2 is a schematic perspective view from inside a vehicle of a portable telephone applied to a complementary box.

With reference now to FIG. 1, each parking network according to the invention comprises at least one central computer 10, located at a suitable location, generally remote from the parking zones. For each subscriber to the network, this latter comprises at least one TRD. In this particular embodiment, for purposes of illustration, the TRD is generally indicated at 11 as a cellular telephone, but this should not be construed as a limitation, as any transmitter-responder device could be used in place of cellular telephone 11. The TRD is mechanically supported by any convenient support member, such as e.g. commonly provided in cars for supporting cellular telephones and the like, indicated at 18 (FIG. 2). The parking system also comprises, for each subscriber, at least one complementary box, generally indicated at 12. Telephone 11 and complementary box 12 are shown in the drawing as operatively connected at 13, for establishing the desired connection between their circuits, when the two devices are coupled. The operative connection may be of any suitable kind, and may e.g. comprise electrical cable means and a junction box, and requires no further description, as it may easily be provided by skilled persons. Power means are preferably provided for feeding electrical power to the complementary box. These means may include the battery of the car in which the box is mounted and an electrical connection between said battery and the box. Autonomous power means, however, could be provided for the box. The TRD, generally, has its own power means, such as batteries, but it may be connected, when in use according to the invention, to the car battery.

Figure 3:
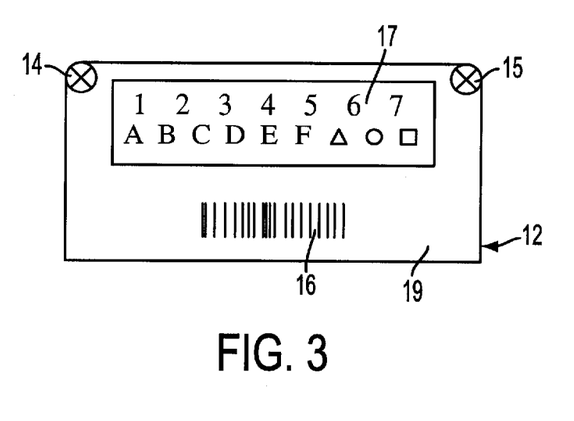
FIG. 3 is a schematic view from the front of a complementary box as seen from the outside of the vehicle.

The complementary box 12 comprises a display 19, shown in the drawing as separate, but actually forming the front of the box 12, consisting for example of two lights 14 and 15 (FIG. 3) of different color, say red and green, and an identification code, say a numerical code such as a bar code or the like, that can be scanned and registered from the outside, indicated at 16 (FIG. 3). The device can also display other information, such as the end of the allowed parking time, etc, as schematically indicated in the display 17 (FIG. 3). The complementary box permits the telephone 11 to communicate with the central computer 10 via antenna 22, by communicating to it the appropriate integrating code, to form, together with the computer's nominal number, the computer's address. The telephone keys, generally indicated at 20, permit to dial and also to transmit other coded information to the central computer 10. 21 and 22 designate antennae of the complementary box and of the central computer, respectively. In lieu of using an antenna which is part of the complementary box, the TRD's antenna could be used. 25 is a control box, to be described hereinafter. 26 is the computer of the PA.

FIG. 2 shows in schematic perspective an example of telephone 11 and a complementary box 12, seen from the interior of the vehicle, while FIG. 3 schematically shows the display 17 of the complementary box 12, as seen through the windshield.

Figure 4:
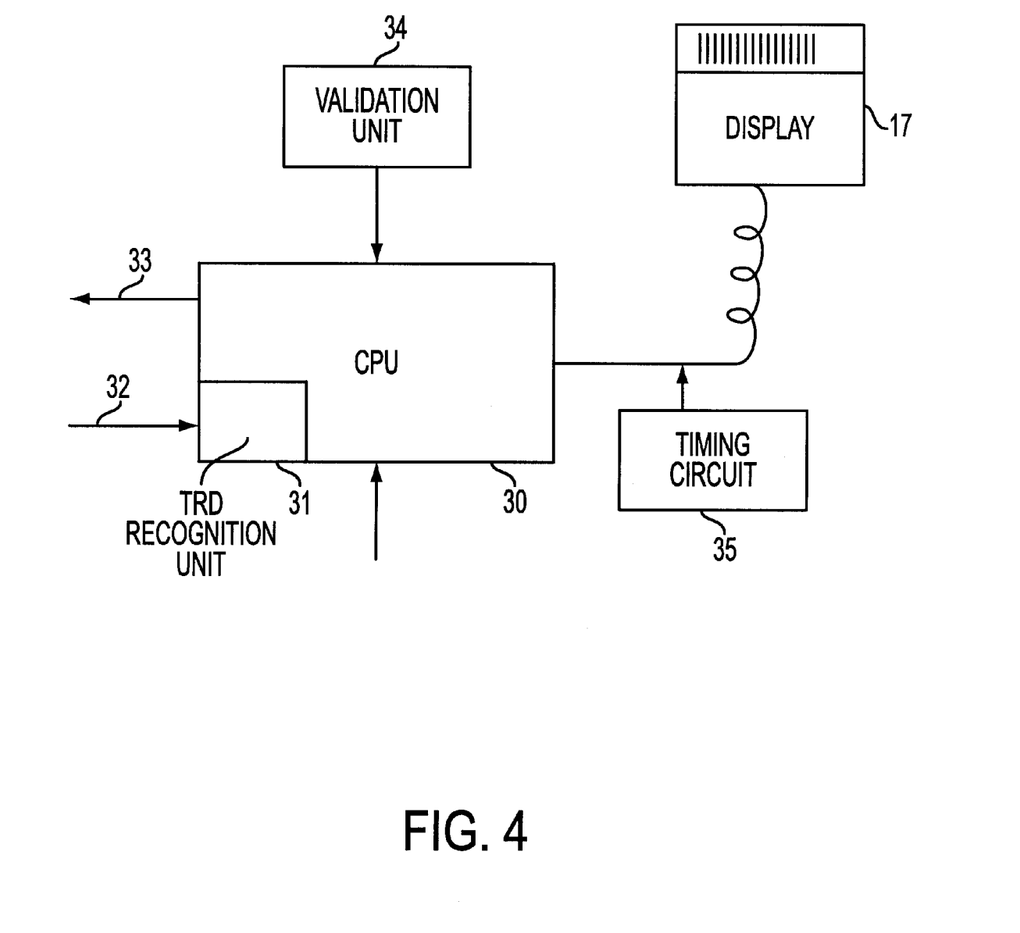
FIG. 4 is a block diagram of an embodiment of a complementary box.

FIG. 4 is a block diagram of a complementary box 12 according to an embodiment of the invention. 30 indicates the CPU of said box. 31 indicates the part of the CPU which recognizes that the appropriate TRD has been connected to the box and provides the validation or consent for the box to carry out its functions. The CPU receives information from the TRD at 32 and sends information to it at 33. 34 is a unit by means of which the validation procedure to be described, for determining that the box 12 is an authentic one, is carried out. 35 is the timing circuitry which effects the countdown of the actual parking time. The complementary box receives power from any convenient source, e.g. the car battery, said power input being indicated by arrow 36.

Each parking network according to the invention is used in the following manner. When the vehicle is parked and the telephone 11 (or other TRD) is coupled with the complementary box 12, the telephone 11 can connect with the central computer 10 by dialing its nominal number. If the telephone is not coupled with the complementary box, the dialing of said number will produce no results, and the telephone will not be connected with the central computer. If the telephone is coupled with the complementary box and said nominal number is dialed, the complementary box integrates it, as has been said, by an integrating code stored in the complementary box memory, to form the computer's address and permits it to receive the communication from the TRD. The driver also dials (desirably by means of the usual keys, though other special keys could be provided) a code number or code numbers identifying the parking zone and all the relevant parameters relating to it. The parking zone may be incorporated in the nominal number.

If the central computer's line is open and connection is made between it and the TRD, the computer will signal to this latter its acceptance of the parking request and any other useful information—unless that particular telephone is disqualified for any reason (either connected to the phone itself, e.g. failure to pay earlier phone bills, or communicated by the PA, e.g. because it is not associated with a solvent charging account, or because parking in that particular location is not allowed at that time). It will also communicate the maximum allowable parking time and any other pertinent information. The central computer's reply will cause the complementary box to activate the signal which indicates legal parking and to begin downcounting the parking time, viz. continuously measuring the time passed and subtracting it from the allowed parking time. This will complete the parking procedure.

If, when the driver dials the computer, the line is busy, the computer will so advise, place the subscriber in a waiting list, and activate the legal parking time. The parking procedure will be completed when the line becomes free, even if the telephone has been removed meanwhile from the complementary box.

Once the parking procedure has been completed, or the subscriber has been put on a waiting list, the TRD can be removed from the complementary box and used in a normal way by the driver; but it cannot communicate with a central computer and request parking anywhere or extension of the allowed parking time, until it is coupled once again to the complementary box.

When the driver leaves the parking space, he calls once again the central computer and communicates the end of parking. The central computer deactivates the complementary box and registers the time elapsed in parking. Based on these data, the OA collects the parking fees, or more precisely, debits the subscriber's account with said fees, which are the paid to the PA. Alternatively, said data may be transmitted to the PA, which, in that case, directly debits the subscriber's account with the corresponding fee.

Figure 5:
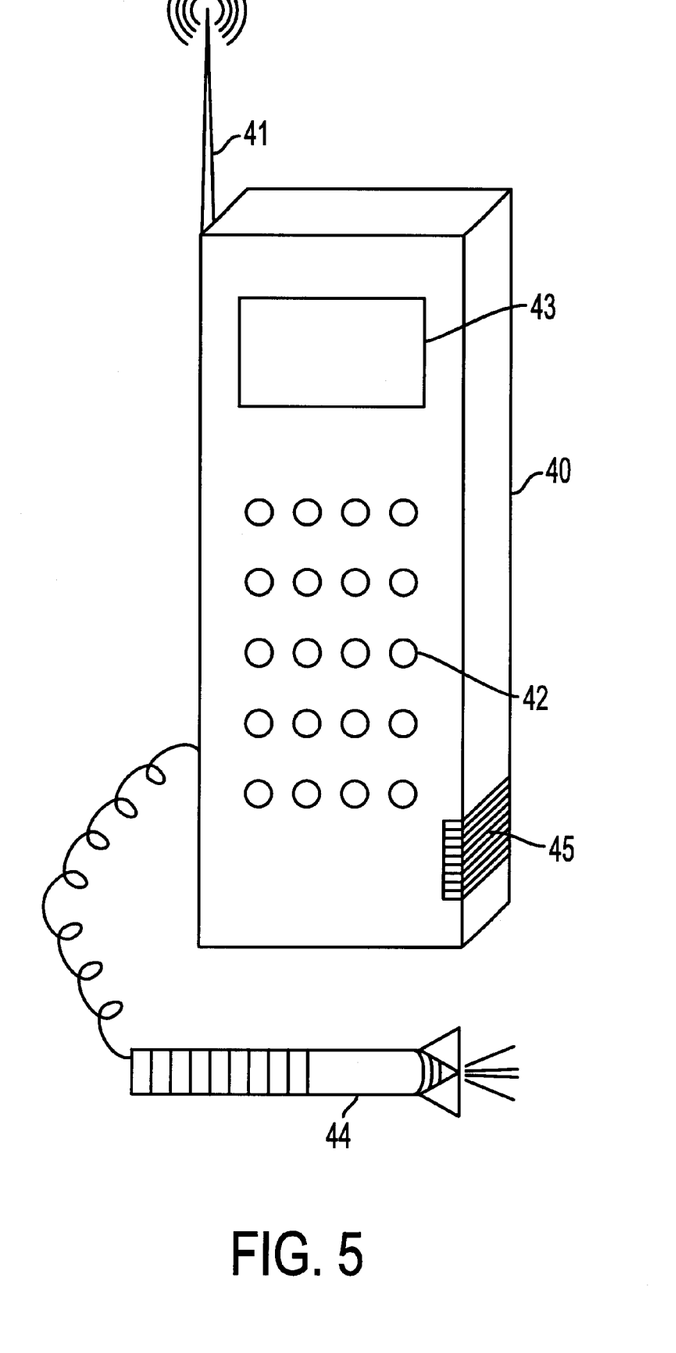
FIG. 5 is a schematic illustration of a control device.

The parking supervisor passes periodically among the parked vehicles with a control device which includes scanning and memory, preferably random-access memory, means. FIG. 5 schematically illustrates such a device, generally indicated at 40. It is provided with an antenna 41, keys 42 and a display 43. It is further provided with a bar code reader or other device for reading the identification marks of the complementary box 12, indicated at 44. 45 indicates means for coupling the device to the PA computer or to a terminal leading to it.

As the supervisor passes near a vehicle or stops in front of it, a validation procedure is firstly carried out, to assure that the complementary box of the vehicle is an authentic, and not a counterfeit or otherwise illegitimate, one. There are several variants of the way in which such a procedure can be carried out. One of them is for the supervisor to send to the box, by infrared or ultrasound or other radiation, a message to which the box responds, according to a program stored in its memory, by showing a coded response in its display. To render circumvention of this procedure more difficult, a number of programs may be stored in each box memory and the supervisor may choose one of them in a random manner. Or the supervisor may change, in a random or other manner, the message he sends to the box. Another validation procedure requires that the box send, by infrared or ultrasound or other radiation, continuously or at short intervals, a message the authenticity of which can be checked by the control device.

Once the validation has given a positive result, the scanning means of the control device scan the identification marks of the complementary box (as has been said, a bar code or any other convenient identification means, either numerical or other) and this identification is registered in the control device memory. If the supervisor sees that a vehicle is illegally parked, because the complementary box is inactivated or signals overtime parking, or for any other reason, he registers this fact in the control device by an appropriate code identifying the particular parking violation. If the complementary box is missing, he may register the plate number of the vehicle. If the complementary box indicates legal parking, he may also enter this fact in the memory of the control device. The communication between the control device and the complementary box, for carrying out the above operations, is schematically indicated at 46 in FIG. 1.

At the end of a specified period, usually at the end of the supervisor's shift or working day, or at any other convenient time, the supervisor will bring his control device to a location designated by the PA, and there he will couple it to a computer or a terminal operated by the PA and transfer to it the content of his control device's memory. The PA may react in any suitable way—which is not a part of the parking method of the invention—to any illegal parking registered by the control device.

Figure 6:
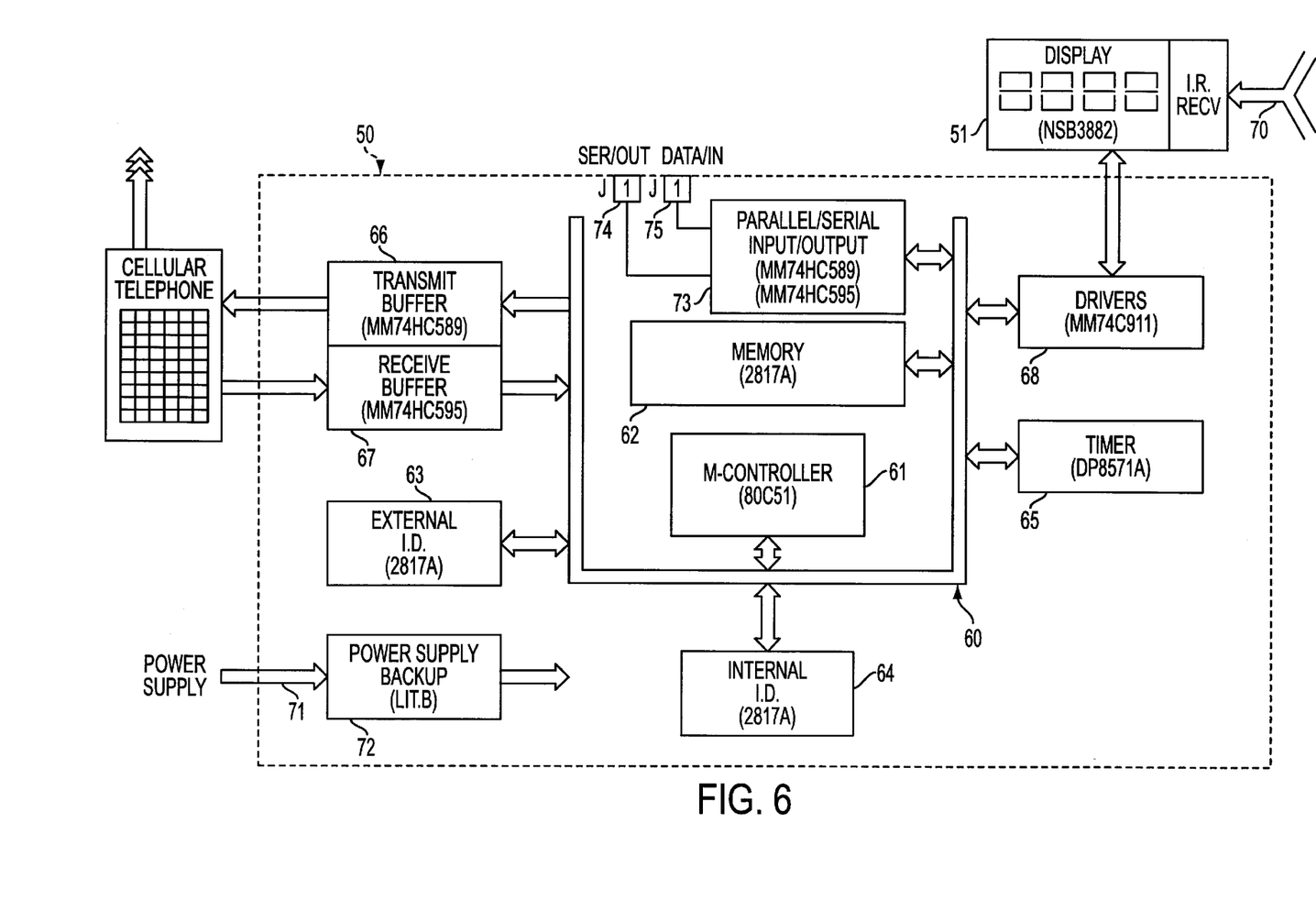
FIG. 6 is a block diagram of a complementary box according to another embodiment of the invention.

The parking networks according to the invention, as has been seen, are based on components which are available in the art or which it is easily within the capability of skilled persons to procure or to design. A central element of each network is constituted by the coupling of the TRD and the complementary box. As has been said, central computers will not accept a communication from any TRD which dials its nominal number, unless this is integrated by a specific code that can be sent only by a complementary box. A block diagram of a complementary box, according to an embodiment of the invention, is shown in FIG. 6, merely for illustration purposes.

Each complementary box has a CPU, which comprises memory means, preferably a ROM. When the subscriber purchases a complementary box, the device manufacturer or seller will register in its memory the number of the TRD, e.g. cellular telephone, which the subscriber intends to use. This can be done in many ways, for instance by coupling the TRD to the complementary box and actuating it, or in any other manner easily understood by skilled persons. Thereafter the complementary box will refuse to communicate in any way with a TRD having a different number, that is, its circuitry will remain inactive until a consent or validation is given by the CPU, which consent is dependent on its having received from a TRD, coupled to the complementary box, the TRD number registered in the box memory. Once the consent has been given, the complementary box will still remain inert as long as the TRD coupled to it does not dial the nominal number of a central computer, and when it dials it, the box will integrate said number with the code stored in its memory. Generally, each subscriber will dial one and only one computer, since each subscriber generally subscribes to a single parking network, as hereinbefore defined, and each such network generally includes one and only one central computer; and therefore only one such code will be stored in the box's memory. However, if a subscriber may have to dial more than one central computer—as might occur if he subscribes to more than one parking network (e.g., if he uses two or more cellular phones belonging to different cellular phone networks) or if the parking network to which he subscribes covers such a wide territory that more than one central computer is required to cover it—the box's memory will store a list of the nominal numbers of such central computers and the corresponding integrating codes. The subscriber will know what central computer is to be contacted in each case, or he will obtain this information from a sign posted at the parking location.

Also, the complementary box has in it a timer which will be set to the allowed parking time and will count the actual parking time. As has been said, the expiration of the allowed time will cause the legal parking sign to be switched off and the illegal parking sign to be switched on. In many cases the legal parking sign will be a green light and the illegal parking sign will be a red light, but different display means can be provided without difficulty.

The supervisor's control device comprises, as has been said, scanning and memory means, means for carrying out the validation procedure, and means for accessing the computer of the PA. Such a device can easily be designed and made by persons skilled in the art.

Referring now the block diagram of FIG. 6, it is assumed that the TRD is a cellular telephone, but it should be clear that it can be any other TRD without requiring any change in the complementary box and therefore this latter could be used in any embodiment of the invention. The complementary box includes an inner circuit generally indicated at 50 and a display, generally indicated at 51. Circuit 50 and display 51 may be embodied in a single physical structure or box, or may be part of separate structures or boxes functionally connected.

The circuit 50 comprises a general bus 60 for connecting the several functional components together. The diagram indicates particular types of the several components which are available on the market, and can be used to construct a specific embodiment of the invention. However it will be obvious that other components, having similar functions, can be used in place of those identified in FIG. 6. Said components, therefore, include a microcontroller or CPU 61, and a non-volatile memory 62. It further comprises an external identification unit 63, which identifies the TRD (in this example, the cellular telephone) and an internal identification unit 64, which identifies the device (complementary box) itself. A timer 65, is further provided for timing the parking. Buffers 66 and 67 are provided to provide buffers for transmission and reception of data between the complementary box and the server telephone. Drivers 68 connect complementary inner circuit 50 to display 51, which can receive infrared or other radiation signal at 70, during the supervision procedure. Power is received by circuit 50 at 71 from a power supply through a power supply backup 72, which assures that the data stored in the device will not be canceled if the device is cut off from its normal power source. Finally, numeral 73 indicates a parallel/serial input/output unit for sending and receiving data at 74 and 75. These have the purpose of permitting the user to request and extract data from the device, for verification or other purpose. As hereinbefore stated, suitable components, for a particular embodiment of the inventions, are identified in FIG. 6, but others may be used by skilled persons.

Figure 7:
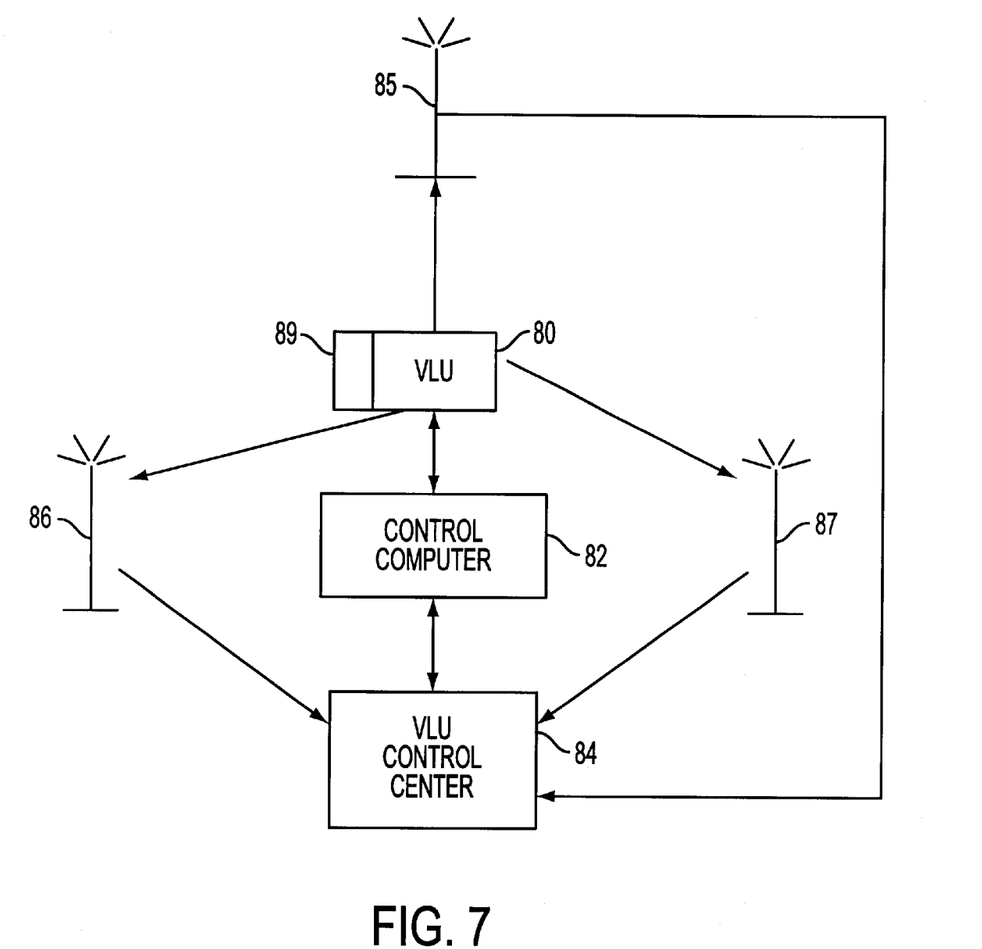
FIG. 7 is a block diagram illustrating a parking system in which a VLU is used as a TRD.

FIG. 7 is a block diagram illustrating a parking system wherein VLU's are employed as TRD's.

In this embodiment of the invention, a vehicle (not shown in the block diagram) belonging to a subscriber to the parking system, has mounted therein a VLU 80, which may be active at all times when the vehicle is operated, or may be activated by the driver at a chosen time during the vehicle's operation, in order that the vehicle be monitored over a considerable length of time or when the vehicle approaches the parking lot and the driver wishes to prepare for the parking procedure. The activation of the VLU causes a signal to be sent to the central computer 82 which controls the parking lot, and the signal comprises an identification code of the vehicle. The computer 82 then sends a signal to the vehicle location system control center 84 requesting the vehicle location data. Concurrently the VLU sends a normal vehicle location signal, which is received by fixed stations e.g. three stations 85, 86 and 87, which transmit data to the control center. The control center computes the location of the vehicle 80 and sends to computer 82 a signal comprising the location data, if they have been requested by said computer. When the signals received by the computer 82 indicate that the vehicle has stopped, the computer compares the coordinates received from the control center 84 to a list of parking lot coordinates contained in its memory, and if it finds that a vehicle has stopped at a parking lot, initiates the parking procedure as hereinbefore described. As a result, the display 89, associated with the VLU and which may be considered part of the complementary box of the parking device, shows that the vehicle is properly parked.

The parking time is now counted. This is preferably done by the central computer, which will consider the parking as ended when the location data it continues to receive from said control center indicate that the vehicle has started moving. A timer, however, can be associated with the VLU, particularly for showing the time elapsed on the display. If such a timer is provided, a signal indicating the end of the parking could also be sent by the VLU to the central computer, but this is not necessary and may be undesirable. In any case, while the parking is in progress, the parking supervisor can see from the display 89 that the vehicle is properly parked and can derive from it and/or exchange with it all useful information, as detailed herein. At the end of the parking, the central computer registers the parking data.

The same operation as described in FIG. 7 can be effected if the driver activates the VLU only when he is in the parking lot. In that case he can send a signal to computer 82, identifying the parking lot, and the intervention of fixed stations 85 to 87 and of the control center 84 is not required. However, alternatively, the system illustrated in FIG. 7 can still be used, in which case, when the driver enters the parking lot, he activates the VLU, the VLU sends a signal to the computer, the computer sends a signal to the control center, etc. as described with reference to FIG. 7. In this case, the signal sent from the VLU to the computer is merely an activating signal and does not need to identify the parking lot, since this will be identified through the location of the vehicle.

In any embodiment of this invention, all the elements of the VLU that are required for its normal operation as part of a vehicle location system may be considered as the TRD of a parking device, while those elements that are part of or associated with the VLU, but are not so required, may be considered as constituting together a complementary box of a parking device.

As noted above, the coupling between the TRD and the complementary box does not necessarily require physical contact between them for initiating the parking procedure. The coupling may be accomplished by connecting the TRD and the complementary box by radiation, e.g., electromagnetic waves, although this has not been illustrated. The TRD and the complementary box may be provided with specific code to allow them communicate exclusively via specific wave frequency, so that the central computer will recognize that the TRD is actually coupled to the complementary box, said complementary box being therefore able to receive the updated data from said central computer. In this way, the subscriber may gain the advantage of prolonging the parking time without being forced to return back to the car. The communication between the various components of the system, required for carrying out the parking procedure, will be as described above, the TRD and the complementary box behaving as if they were coupled physically.

While embodiments of the device have been described for purposes of illustration, it will be apparent that the invention will be carried into practice with many modifications, variations and adaptations, without departing from its spirit or exceeding the scope of the claims.

What is claimed is:

1. A parking authorization method, comprising the steps of:

transmitting a parking authorization request signal from a transmitter-responder device in a vehicle to a central computer located remote from said vehicle;

receiving said parking authorization request signal at said central computer and allocating parking time based upon said request;

transmitting a parking authorization signal which includes said allocated parking time from said central computer to a complementary box in the vehicle;

extracting said allocated parking time from said parking authorization signal;

storing said allocated parking time in a memory of said complementary box; and down counting said allocated parking time stored in said complementary box; and calculating the cost of said authorized parking time at said central computer.

2. The parking method of claim 1 further comprising the step of generating an authorized parking signal at said complementary box upon receiving the parking authorization signal from said central computer.

3. The parking method of claim 2 further comprising the step of transmitting said authorized parking signal to an enforcement unit located remote from said vehicle.

4. The parking method of claim 3 further comprising the step of transmitting said authorized parking signal from said complementary box to said enforcement unit by wireless electromagnetic wave transmission signals.

5. The parking method of claim 1 further comprising the step of lighting an LED when said authorized parking signal indicates that allocated parking time remains in said complementary box.

6. The parking method of claim 1 further comprising the step of linking said transmitter-responder device to said complementary box before said parking authorization may be requested.

7. The parking method of claim 6 wherein said linking step is accomplished through use of electromagnetic waves.

8. The parking method of claim 6 wherein said transmitting a parking authorization request signal step further comprises the steps of:

transmitting transmitter-responder device identifying data to said complementary box;

operating on said transmitter-responder device identifying data with a complementary box identifying code to generate said parking authorization request signal.

9. The parking method of claim 8 wherein said parking authorization request signal includes data identifying the location of a parking space for which parking authorization is requested.

10. The parking method of claim 9 wherein said transmitter-responder device is a vehicle location unit.

11. The parking method of claim 1 wherein said transmitting said authorized parking signal steps are accomplished by electromagnetic wave transmission over satellite links.

* * * * *